United States Patent
Nosu et al.

(10) Patent No.: US 6,218,454 B1
(45) Date of Patent: *Apr. 17, 2001

(54) ACID RESISTANT, THERMOPLASTIC RESIN COMPOSITION CONTAINING MAGNESIUM HYDROXIDE AND ITS USE

(75) Inventors: Tsutomu Nosu; Tomoko Tachifuji; Wataru Hiraishi, all of Sakaide (JP)

(73) Assignee: Kyowa Chemical Industry Co., Ltd., Kagawa-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,004

(22) Filed: Oct. 15, 1998

(30) Foreign Application Priority Data

Oct. 17, 1997 (JP) .................................................. 9-303677

(51) Int. Cl.$^7$ ............................... C08K 3/20; C08K 3/22; C08K 9/06
(52) U.S. Cl. .......................... 524/433; 524/436; 524/400; 524/417; 524/394; 524/128; 524/266; 523/204; 525/106
(58) Field of Search .................................... 524/433, 436, 524/400, 417, 394, 128 P, 266; 523/204; 525/106

(56) References Cited

U.S. PATENT DOCUMENTS

| 4,098,762 | * | 7/1978 | Miyata et al. | 106/306 |
|---|---|---|---|---|
| 4,891,399 | * | 1/1990 | Ohkawa et al. | 523/203 |
| 4,983,742 | * | 1/1991 | Yusawa et al. | 524/436 |
| 5,025,042 | * | 6/1991 | Yoshida et al. | 523/210 |

FOREIGN PATENT DOCUMENTS

| 0 352 699 | 1/1990 | (EP) . |
|---|---|---|
| 0 356 139 | 2/1990 | (EP) . |
| WO95/19935 | 7/1995 | (WO) . |

OTHER PUBLICATIONS

Database WPI, Section Ch, Week 9314, Abstract No. 93–112857 (abstract of JP 5–051499) (Mar. 2, 1993).

* cited by examiner

Primary Examiner—James J. Seidleck
Assistant Examiner—Olga Asinovsky
(74) Attorney, Agent, or Firm—Wenderoth, Lind & Ponack, L.L.P.

(57) ABSTRACT

An acid-resistant, thermoplastic resin composition which is nonpoisonous and non-halogen and has an acid-resistance for a long period of time, the acid-resistant, thermoplastic resin composition containing a thermoplastic resin, 30 to 70% by weight of magnesium hydroxide which has a specific surface area of 20 m$^2$/g or less and an average secondary particle diameter of 0.2 to 5.0 μm and is surface-treated with at least one surface-treating agent selected from a water-soluble silane-coupling agent, a phosphoric acid ester, a higher fatty acid or its alkali metal salt, and 1 to 20% by weight of a reaction type compatibilizing agent.

3 Claims, No Drawings

ACID RESISTANT, THERMOPLASTIC RESIN COMPOSITION CONTAINING MAGNESIUM HYDROXIDE AND ITS USE

FIELD OF THE INVENTION

The present invention relates to an acid-resistant, thermoplastic resin composition containing magnesium hydroxide and its molded article. More specifically, the present invention relates to an acid-resistant, thermoplastic resin composition containing a magnesium hydroxide which is surface-treated with at least one compound selected from a water-soluble silane coupling agent, a phosphoric acid ester, a higher fatty acid and an alkali metal salt of higher fatty acid, and a reaction type compatibilizing agent.

PRIOR ART OF THE INVENTION

A halogen-containing flame-retardant for a synthetic resin, which flame-retardant is obtained from an organic halogen compound or a combination of an organic halogen compound and antimony trioxide, has caused a problem socially, since it generates a great deal of smoke and poisonous gases in fire. Therefore, development works for a nonpoisonous flame-retardant containing no halogen have been vigorously made, and magnesium hydroxide has come into effective use. The magnesium hydroxide is required to be incorporated in a higher concentration to some extent as compared with the organic halogen-containing flame-retardant, and the incorporation in high concentration impairs physical properties of a resin. JP-A-54-83952 discloses a magnesium hydroxide having a BET specific surface area of 20 m$^2$/g or less and having a BET specific surface area/Blaine permeability method specific surface area ratio in the range of about 1 to 3 as a magnesium hydroxide which does not so much impair physical properties of a resin. Further, magnesium hydroxide has a higher decomposition temperature than aluminum hydroxide so that magnesium hydroxide is not in danger of causing bubbles in a resin molded article at a molding/processing time. Resin molded articles obtained from a resin containing magnesium hydroxide in a high concentration are broadly used for nuclear plants, shipping, offshore oilfields, subways, electric cable servings, communication cables, lags, home electric appliances, office instruments, cars and so on.

However, when these products using magnesium hydroxide as a flame-retardant are subjected to carbonic acid-containing water or acid rain for a long time, the magnesium hydroxide in the thermoplastic resin is dissolved with the acid water so that air holes are generated. Further, a carbonic acid salt, a basic carbonic acid salt, or the like, is generated due to carbon dioxide in the air, and the surface of a resin molded article is whitened, which worsen the appearance of the molded article. It has been found that the so-generated decrease of the magnesium hydroxide concentration causes a problem that flame retardancy which is naturally present is decreased. Furthermore, when the resin-molded article comes into contact with acid agents such as hydrochloric acid or sulfuric acid, the above mentioned corrosion phenomenon occurs remarkably, and, for example, the use in a cable serving for chemical plant is therefore limited.

For overcoming these problems, for example, JP-A-1-245039 discloses a flame-retardant which is obtained by treating the surface of magnesium hydroxide particle with an alkali metal salt of higher fatty acid and then treating it with a sodium salt of boric acid or silicic acid and which is excellent in humidity-resistance, acid-resistance and dispersibility in a resin. Further, JP-A-2-55746 discloses a flame-retardant obtained by surface-treating magnesium hydroxide with a dialcohol amine salt of alcohol phosphoric acid ester or an alkali metal salt.

However, the above flame-retardants are insufficient in acid-resistance against carbonic acid-containing water or acid rain although improved to some extent. For example, the acid-resistance against an acid having a high concentration such as a 36% hydrochloric acid is scarcely improved.

Conventional resin compositions obtained by highly incorporating magnesium hydroxide as a flame-retardant are poor in acid-resistance and resistance against carbonic acid gas. Further, a factory in which a chemical agent is handled requires a resin composition that endures a strong acid, while the conventional resin compositions do not satisfy this requirement. However, there is a strong requirement for a thermoplastic resin composition which inhibits the generation of smoke in fire and which is nonpoisonous and non-halogen. And, there is also a strong requirement for a thermoplastic resin composition which is further able to keep acid-resistance for a long period of time.

SUMMARY OF THE INVENTION

It is an object of the present invention to provide an acid-resistant, thermoplastic resin composition satisfying the above requirements and its molded article.

The present invention provides an acid-resistant, thermoplastic resin composition which contains a thermoplastic resin, 30 to 70% by weight, based on the resin composition, of magnesium hydroxide having a specific surface area of 20 m$^2$/g or less, having an average secondary particle diameter of 0.2 to 5.0 μm and surface-treated with at least one surface-treating agent selected from the group consisting of the following a, b and c, a. a water-soluble silane-coupling agent
  b. a phosphoric acid ester of the formula [2],

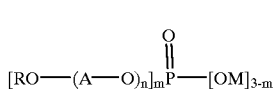

(2)

[wherein R is an alkyl group or alkenyl group which has 1 to 24 carbon atoms, A is an alkylene group having 2 to 4 carbon atoms, M is an alkali metal, a cation of an alkyl amine having 1 to 4 carbon atoms or a cation of an alkanolamine of the formula [3],

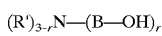

(3)

(wherein R' is a hydrogen atom or an alkyl group having 1 to 3 carbon atoms, B is an alkylene group having 2 to 4 carbon atoms and r is an integer of 1 to 3),
n is an integer of 0 to 6 and m is 1 or 2],
  c. a higher fatty acid and/or an alkali metal salt thereof,
and 1 to 20% by weight, based on the resin composition, of a reaction type compatibilizing agent.

Further, the present invention provides an acid-resistant, thermoplastic resin composition obtained by incorporating a magnesium hydroxide which is obtained by surface-treating about 10 to 80%, preferably about 15 to 50%, of the particle surface of magnesium hydroxide having the above specific surface area and the average secondary particle diameter with at least one selected from phosphoric acid ester, a higher fatty acid or an metal salt of higher fatty acid, into a thermoplastic resin in predetermined amounts together with a reaction type compatibilizing agent. Detailed Description of the Invention The present inventors have made various studies for overcoming the above problems and found that acid-resistance of a thermoplastic resin is remarkably improved when a specific magnesium hydroxide and a reaction type comatibilizing agent in predetermined amounts are incorporated into the thermoplastic resin. And the present invention has been accomplished.

The magnesium hydroxide used in the present invention is a magnesium hydroxide whose crystal is grown well and which is free from aggregation. Due to the above features of the magnesium hydroxide, excellent moldability, mechanical strength and flame retardancy are appeared. That is, the magnesium hydroxide used in the present invention is a magnesium hydroxide which has a BET specific surface area of 20 m$^2$/g or less, preferably 3 to 10 m$^2$/g, and has an average secondary particle diameter of 0.2 to 5.0 μm, preferably 0.5 to 3 μm. The magnesium hydroxide may be a synthetic product or a natural product so long as the magnesium hydroxide has the above features.

The silane-coupling agent used in the present invention is a compound of the formula (1),

X—(CH$_2$)$_n$—Si—(OR)$_3$      (1)

(wherein X is a vinyl group, an amino group, an epoxy group, etc., R is a methyl group, an ethyl group, a propyl group or γ-methoxyethyl group, n is an integer of 0 to 3 and X is particularly preferably an amino group.)

The surface treatment amount of the silane coupling agent based on the magnesium hydroxide is 0.1 to 3% by weight, preferably 0.3 to 1% by weight. When it is less than the lower limit of the above range, the magnesium hydroxide shows a strong aggregation and the dispersibility in a resin is therefore apt to be poor. When it is greater than the upper limit of the above range, the dispersibility is not further improved and it is therefore undesirable in view of economy.

The magnesium hydroxide maybe surface-treated with the silane coupling agent by known methods, i.e., a dry process or a wet slurry method. In view of a uniform treatment, the wet slurry method is more preferable. Further, the silane-coupling agent is hydrolyzed in its aqueous solution and the hydrolyzed silane-coupling agent is used for surface-treating the magnesium hydroxide. The silane-coupling agent is therefore preferably a silane-coupling agent which can be dissolved in general water. Some silane-coupling agents do not be hydrolyzed unless pH is decreased to about 4 with acetic acid or the like. When these silane-coupling agents are used, undesirably, the surface of the magnesium hydroxide is corroded with an acid in a process of the surface-treatment to give a product having a poor acid-resistance or generate a magnesium hydroxide which decreases the volume resistivity of a serving when used for electric cables.

In the wet slurry method, magnesium hydroxide is dispersed in water, and a silane-coupling agent, which is dissolved in ion-exchanged water and have a concentration of 5% by weight or less, is step by step added in a required amount with stirring at high speed. After the completion of adding, the high speed-stirring is continued for about 15 to 30 minutes. The slurry obtained after the treatment is recovered by filtration, and dried at about 120° C. Or the slurry obtained after the treatment may be directly spray-dried.

The phosphoric acid ester is represented by the formula (2),

[RO—(A—O)$_n$]$_m$P—[OM]$_{3-m}$      (2)

[wherein R is an alkyl group or alkenyl group which has 1 to 24 carbon atoms, A is an alkylene group having 2 to 4 carbon atoms, M is an alkali metal, a cation of an alkyl amine having 1 to 4 carbon atoms or a cation of an alkanolamine of the formula [3],

(R')$_{3-r}$N—(B—OH)$_r$      (3)

(wherein R' is a hydrogen atom or an alkyl group having 1 to 3 carbon atoms, B is an alkylene group having 2 to 4 carbon atoms and r is an integer of 1 to 3), n is an integer of 0 to 6 and m is 1 or 2].

The amount of the phosphoric acid ester based on the magnesium hydroxide may be an amount sufficient for covering about 10 to 80%, preferably about 15 to 50%, of the specific surface area of the magnesium hydroxide according to a BET method. The phosphoric acid ester amount for covering 100% of the specific surface area can be calculated by measuring the consumption speed of hydrochloric acid for maintaining pH at 4 with an autoburet. That is, when 100% of the surface of the magnesium hydroxide is covered with the phosphoric acid ester, the magnesium hydroxide itself is improved in acid-resistance and can be distinguished from a magnesium hydroxide which is incompletely covered. On the basis of the above matter, the surface treatment amount may be determined. For example, when a magnesium hydroxide having a BET specific surface area of 7 m$^2$/g is used, the surface treatment may be carried out so as to make the amount of a phosphoric acid ester having an average molecular weight of about 450 be about 0.5 to 2% by weight based on the magnesium hydroxide.

In the surface-treatment, a dispersion of magnesium hydroxide in water is maintained at a temperature at which a surface treating agent of the phosphoric acid ester can be dissolved or at a higher temperature and the aqueous solution of the surface treating agent is step by step added with stirring. After the completion of the adding, the stirring is continued for 15 to 30 minutes. The so-obtained slurry of the surface-treated magnesium hydroxide is dehydrated, washed with water and dried according to a general method.

When the higher fatty acid or its alkali metal salt is used for the surface treatment, the surface treatment may be carried out by spraying a higher fatty acid dissolved with heat or with a solvent or its alkali metal salt to magnesium hydroxide and carrying out a drying process with a Henschel mixer, etc. However, in view of uniform treatment, preferred is a wet method in which a dispersion of magnesium hydroxide in water is maintained at a temperature at which a surface treating agent of the higher fatty acid or its alkali metal salt can be dissolved or at a higher temperature, the aqueous solution of the surface treating agent is step by step added with stirring, after the completion of the adding, the stirring is continued for 15 to 30 minutes and the so-obtained slurry of the surface-treated magnesium hydroxide is dehydrated, washed with water and dried according to a general method. The surface treatment amount of the higher fatty acid is can be determined by the use of the molecule occupation areas of higher fatty acids, which are described in "Chemical Handbook" edited by The Chemical Society of Japan. The amount of the higher fatty acid based on the magnesium hydroxide may be an amount sufficient for covering 10 to 80%, preferably 15 to 50%, of the specific surface area according to a BET method, which is the same as in the phosphoric acid ester. Examples of the higher fatty acid and its alkali metal salt include stearic acid, oleic acid, palmitic acid, lauric acid, arachiclic acid, sodium salts of these and potassium salts of these. Further, the amount of the higher fatty acid for the covering will be explained below. Stearic acid is taken as an example. The molecule occupation area of the stearic acid is 20.5 square angstrom/molecule. For covering 100% of the particle surface of a magnesium hydroxide having a BET specific surface area of 7.0 $m^2/g$, it is sufficient to add the stearic acid in an amount of 1.6% by weight based on the magnesium hydroxide. In the present invention, for example, for covering 40% of the particle surface area of the magnesium hydroxide, it is therefore sufficient to add the stearic acid in an amount of 0.64% by weight based on the magnesium hydroxide for the treatment.

The surface-treated magnesium hydroxide should be contained in an amount of 30 to 70% by weight in the resin composition. When the content of the magnesium hydroxide is less than the lower limit of the above range, undesirably, the flame retardancy is poor. When it is greater than the upper limit of the above range, undesirably, the moldability and mechanical strength of the resin composition is insufficient.

The reaction type compatibilizing agent used in the present invention is a reaction type compatibilizing agent obtained by attaching, as a modifying agent, an unsaturated carboxyl compound having at least one unsaturated bond in its molecule and having a carboxyl group to an unmodified thermoplastic polymer. The content of the attached carboxyl group in the modified thermoplastic polymer is 0.1 to 10% by weight, preferably 0.1 to 4% by weight. When the content is outside the above range, undesirably, the physical properties of a molded article and the appearance of the molded article are degraded. Example of the modifying method includes a method in which a thermoplastic polymer is knead-treated under heat together with an unsaturated carboxyl compound in the presence of an organic peroxide. The heating temperature differs depending upon the resin to be used and the organic peroxide, while it is generally 100 to 300° C. Examples of the unsaturated carboxyl compound include anhydrous maleic acid, anhydrous itaconic acid, anhydrous citraconic acid and anhydrous fumaric acid. The anhydrous maleic acid is preferable in particular.

The thermoplastic polymer used in the above modification includes various polymers such as homopolymer, copolymer and graft polymer. Examples thereof include propylene polymer, ethylene-α-olefin copolymer, styrene-ethylene-butadiene copolymer and EPDM. The modified thermoplastic polymer obtained by using these polymers, i.e., the reaction type compatibilizing agent is commercially available in the trade names of "KRATONG G", "Tuftec", "Umex", "RESEDA", "MODIPER", etc., and it is easily available. These reaction type compatibilizing agents may be used alone or in combination. The content thereof in the resin composition is 1 to 20% by weight, preferably 2 to 10% by weight. When the content thereof is less than the lower limit of the above range, the acid-resistance is poor. When the content thereof is greater than the upper limit, the moldability and mechnical strength are insufficient.

As a thermoplastic resin used in the acid-resistant, thermoplastic resin composition of the present invention, a polyolefin resin is most preferable. Examples of the preferable polyolefin resins include polyethylene, polypropylene and various polyethylene copolymers such as an ethylene-butene copolymer, an ethylene-propylene copolymer, an ethylene-ethyl acrylate copolymer, an ethylene-ethyl acetate copolymer and an ethylene-methyl methacrylate copolymer. These resins may be used alone or in combination of at least two kinds. The other resins include polyvinyl chloride, polyamide, polystyrene, styrene polymers such as ABS, polyesters, polycarbonates and various rubbers such as EPDM.

The acid-resistant, thermoplastic resin composition of the present invention can be produced by various methods such as a method in which a thermoplastic resin, magnesium hydroxide and a reaction type compatibilizing agent are simultaneously kneaded, a method in which magnesium hydroxide is added into a resin composition of a thermoplastic resin and a reaction type compatibilizing agent and kneaded, a method in which a thermoplastic resin and magnesium hydroxide are kneaded, and then a reaction type compatibilizing agent is added and kneaded or a method in which the mixture obtained from a reaction type compatibilizing agent and magnesium hydroxide in advance is added to a thermoplastic resin which is being kneaded and the resultant mixture is kneaded.

The reaction type compatibilizing agent has a functional group such as anhydrous dicarboxylic acid in its molecule, and this functional group can be reaction-bonded to a functional group, such as OH, COOH or $NH_2$ group, of magnesium hydroxide including a magnesium hydroxide coated with the resin and a magnesium hydroxide surface-treated with the surface treating agent. It is assumed that the magnesium hydroxide particles which are strongly covered with thick layers of the resin and the reaction type compatibilizing agent are dispersed and embedded (buried) in the resin so that the acid-resistance is improved. However, when the whole surface of the magnesium hydroxide particle is surface treated with phosphoric acid ester, a higher fatty acid or its alkali metal salt, only a small improvement in acid-resistance is observed by adding a reaction type compatibilizing agent. It is assumed that the reason why there is only a small improvement in acid-resistance when 100% of the surface of the magnesium hydroxide is covered with the phosphoric acid ester, the higher fatty acid or its salt, is that the reaction type compatibilizing agent can not bond to OH group of the magnesium hydroxide.

Further, concerning a magnesium hydroxide which is not surface-treated at all, the magnesium hydroxide is poor in dispersibility into a resin. The composition containing the above magnesium hydroxide which is not surface-treated is inferior in flame retardancy, acid-resistance and appearance of a molded article to the composition containing the surface-treated magnesium hydroxide.

The thermoplastic resin composition of the present invention may contain generally used additives other than the above components in the range in which flame retardancy, physical properties, etc., does not be degraded substantially. Examples of the additives include ultraviolet absorbent, antioxidant, antistatic agent, lubricant, pigment, colorant, blowing agent, plasticizer, flame retardant aid such as red phosphorus and dispersant.

The incorporation of the above additives into the thermoplastic resin may be carried out with known kneading machines such as a Banbury mixer, a kneader, a roll mill and a uniaxial or biaxial screw extruder. A molded article can be obtained by known methods such as an injection molding method, an extrusion molding method, a calender molding method and a press molding method.

EXAMPLES

The present invention will be explained more in detail with reference to Examples hereinafter. Methods of measurements of various properties such as a specific surface area, an average secondary particle diameter, etc., are as follows.

<Specific surface area>

The specific surface area was measured according to a BET method.

<Average secondary particle diameter>

1% by weight aqueous slurry of magnesium hydroxide was dispersion-treated with ultrasonic for 3 minutes and then measured with a microtrack (laser diffraction scattering method, supplied by Nikkiso K.K).

<Acid-resistance>

A composition containing a thermoplastic resin was kneaded for five minutes with a Brabender Plastograph which was oil-heated at 200° C., and then press-molded to have a thickness of 2 mm. The press-molded material was cut to give a test piece having a size of 4 cm×5 cm. The test piece was placed in a desiccator having a volume of about 10 liters, and 1 ml of 35% by weight hydrochloric acid was then magnesium hydroxide was added and kneaded for further 5 minutes. Then, the kneaded mixture was press-molded to have a thickness of 1 mm. Then, the whole whitened portions of the surface were observed and visually evaluated. Further, when polypropylene was used as a thermoplastic resin, the press-molding was carried out at 230° C. When the other resin was used as a thermoplastic resin, the press-molding was carried out at 200° C.

EXAMPLES 1 to 9, COMPARATIVE EXAMPLES 1 to 5

A synthetic magnesium hydroxide having a BET method specific surface area of 6 to 7 $m^2/g$ and having an average secondary particle diameter of 0.8 to 1.2 pm was surface-treated with each surface-treating agent shown in Table 1 by a wet method. Components shown in Table 1 in amounts shown in Table 1 were kneaded to prepare test pieces. The test pieces were measured for various properties. Table 1 shows the mixing amounts, etc. Table 2 shows the measurement results.

TABLE 1

|  | Surface treating agent | | Magnesium hydroxide amount (% by weight) | Thermo-plastic resin | Reaction type compatibilizing agent | |
| --- | --- | --- | --- | --- | --- | --- |
|  | Kind | Treatment amount (% by weight) |  |  | Kind | Amount (% by weight) |
| Ex. 1 | A | 0.3 | 50 | PP | E | 5.0 |
| Ex. 2 | A | 1.0 | 50 | PP | E | 5.0 |
| Ex. 3 | A | 1.0 | 50 | PP | E | 2.5 |
| Ex. 4 | A | 1.0 | 50 | PP | F | 5.0 |
| Ex. 5 | B | 1.0 | 50 | PP | F | 5.0 |
| Ex. 6 | C | 0.6 | 50 | PP | E | 5.0 |
| Ex. 7 | D | 0.6 | 50 | HDPE | E | 5.0 |
| Ex. 8 | D | 0.6 | 60 | LLDPE | E | 10.0 |
| Ex. 9 | A | 1.0 | 50 | EEA | F | 5.0 |
| CEx. 1 | No | — | 50 | PP | No | — |
| CEx. 2 | No | — | 50 | PP | E | 5.0 |
| CEx. 3 | A | 1.0 | 50 | PP | No | — |
| CEx. 4 | C | 4.0 | 50 | PP | E | 5.0 |
| CEx. 5 | D | 3.0 | 50 | HDPE | E | 5.0 |

EX. = Example, CEx. = Comparative Example dropped on the test piece. The test piece was taken out after 24 hours. The surface condition of the test piece was observed. The less the acid-resistance was, the more magnesium hydroxide was eluted, the more air holes were appeared and the more the surface was whitened. This color change was measured with a color difference meter ("ZE-2000", supplied by Nippon Denshoku Kogyo K.K) and expressed with a ΔE value. Further, in the acid-resistance test, 0.08% by weight of ultramarine as a pigment was incorporated into the composition containing a thermoplastic resin for easily evaluating a degree of whitening.

<Flame retardancy>

In the same manner as in the above test, a composition containing a thermoplastic resin was kneaded with a Brabender Plastograph and press-molded to give a 94 HB test piece suited to UL flame resistance test gauge. The flame retardancy test was carried out according to the HB method <Dispersibility into a resin>

A thermoplastic resin and a reaction type compatibilizing agent were melt-kneaded with a Brabender Plastograph, and Notes:

Surface-treating agents for magnesium hydroxide.

A: γ-aminopropyl trimethoxy silane

B: γ-(2-aminoethyl)aminopropyl trimethoxy silane

C: Sodium stearate

D: Sodium salt of stearyl alcohol phosphoric acid ester

Reaction type compatibilizing agent

E: "Umex 1010"(suppliedbySanyo Chemical Inustries, Ltd.)

F: "Tuftec M-1943"(Asahi Chemical Industry Co., Ltd.)

Thermoplastic resin

PP: polypropylene ("BC6", supplied by Nihon Porikemu K.K.)

HDPE: High-density polyethylene("M850", supplied by Chisso Corporation)

LLDPE: Linear low-density polyethylene("UF240", supplied by Nihon Porikemu K.K.)

EEA: Ethylene ethyl acrylate copolymer("NUC830", supplied by Nihon Yunika K.K.)

TABLE 2

|  | Acid-resistance (ΔE) | Flame retardancy 94HB method | Dispersibility |
|---|---|---|---|
| Ex. 1 | 2.1 | Pass | good |
| Ex. 2 | 1.2 | Pass | good |
| Ex. 3 | 4.7 | Pass | good |
| Ex. 4 | 2.9 | Pass | good |
| Ex. 5 | 1.6 | Pass | good |
| Ex. 6 | 6.8 | Pass | good |
| Ex. 7 | 6.5 | Pass | good |
| Ex. 8 | 5.2 | Pass | good |
| Ex. 9 | 4.6 | Pass | good |
| CEx. 1 | 16.5 | Pass | poor |
| CEx. 2 | 10.5 | Pass | poor |
| CEx. 3 | 14.9 | Pass | good |
| CEX. 4 | 12.3 | Pass | good |
| CEx. 5 | 11.5 | Pass | good |

Ex = example, CEx = comparative example

Effect of the Invention

According to the present invention, a surface-treated magnesium hydroxide and a reaction type compatibilizing agent are contained in a thermoplastic resin, whereby there is provided a thermoplastic resin composition which can give a molded article bearable for an acid having a high-concentration for a long period of time.

What is claimed is:

1. An acid-resistant, thermoplastic resin composition, which comprises a thermoplastic resin, 30 to 70% by weight, based on the resin composition, of magnesium hydroxide particles having a specific surface area of 20 m²/g or less, having an average secondary particle diameter of 0.2 to 5.0 μm and surface treated over about 10 to 80% of their surface with at least one surface-treating agent selected from the group consisting of the following b. and c. or over up to 100% of their surface with the following surface-treating agent a.:

a. a water-soluble silane-coupling agent;

b. a phosphoric acid ester of the formula (2), $$(RO-(A-O)_n)_m P(=O)-(OM)_{3-m} \quad (2)$$

wherein
R is an alkyl group or alkenyl group which has 1 to 24 carbon atoms, A is an alkylene group having 2 to 4 carbon atoms, M is an alkali metal, a cation of an alkyl amine having 1 to 4 carbon atoms or a cation of an alkanolamine of the formula (3), $$(R')_{3-r}N-(B-OH)_r \quad (3)$$

wherein
R' is an hydrogen atom or an alkyl group having 1 to 3 carbon atoms, B is an alkylene group having 2 to 4 carbon atoms and r is an integer of 1 to 3,
n is an integer of 0 to 6 and m is 1 or 2, c. a higher fatty acid and/or its alkali metal salt, and 1 to 20% by weight, based on the resin composition of a reactive compatibilizing agent which is a thermoplastic polymer modified with a compound whose molecule has at least one unsaturated bond and which has two carboxyl groups.

2. The acid-resistant, thermoplastic resin composition according to claim 1, wherein the magnesium hydroxide is a magnesium hydroxide which is surface-treated with the water-soluble silane-coupling agent.

3. A molded article, which is molded from the acid-resistant, thermoplastic resin composition as recited in claim 1.

* * * * *